F. J. LAPOINTE.
CUTTER BAR AND BUSHING THEREFOR.
APPLICATION FILED JUNE 7, 1913.
1,088,828.
Patented Mar. 3, 1914.
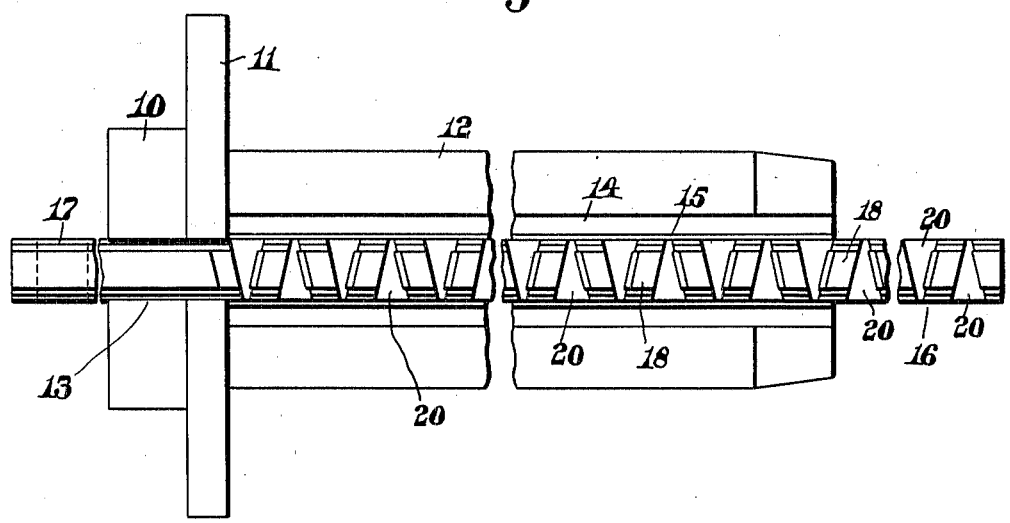
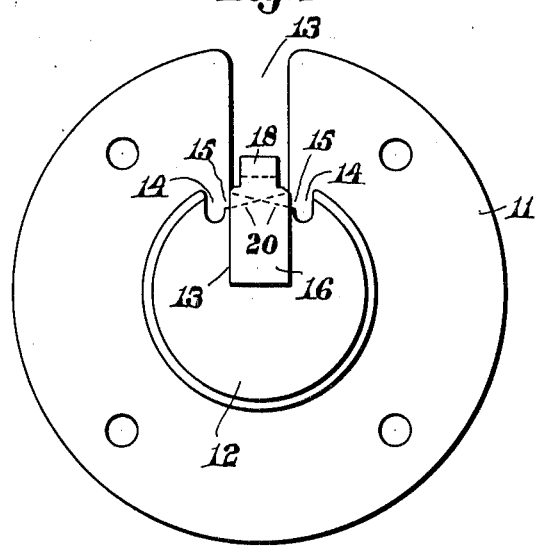
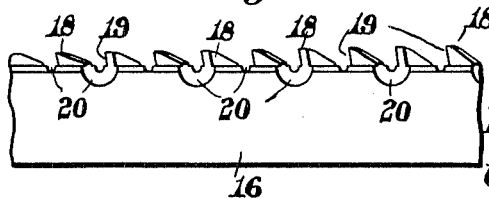
Witnesses:
N. C. Lombard
Edward F. Allen.
Inventor:
Francis J. Lapointe,
by Walter E. Lombard,
Atty.

UNITED STATES PATENT OFFICE.

FRANCIS J. LAPOINTE, OF NEW LONDON, CONNECTICUT.

CUTTER-BAR AND BUSHING THEREFOR.

1,088,828.

Specification of Letters Patent.   Patented Mar. 3, 1914.

Application filed June 7, 1913.   Serial No. 772,438.

*To all whom it may concern:*

Be it known that I, FRANCIS J. LAPOINTE, a citizen of the United States of America, and a resident of New London, in the county of New London and State of Connecticut, have invented certain new and useful Improvements in Cutter-Bars and Bushings Therefor, of which the following is a specification.

This invention relates to cutter-bars and work supporting bushings therefor adapted for use in connection with key-seat broaching machines in which said cutter-bar is connected to some reciprocatory member of the machine which moves it through a slot in the work supporting bushing thereby permitting the teeth thereon to cut a key-way in the pulley, gear, or other member supported on said bushing.

The invention consists in certain novel features of construction and arrangement of parts which will be readily understood by reference to the description of the drawings and to the claims hereinafter given.

Of the drawings: Figure 1 represents a plan of a cutter-bar and the work supporting bushing therefor, portions of each being broken away. Fig. 2 represents an end view of the same, and Fig. 3 represents a side view of a portion of the cutter-bar.

Similar characters designate like parts throughout the several figures of the drawings.

In the drawings, 10 represents the hub of a work support adapted to be inserted in the opening in the face plate of a broaching machine of any well-known construction, the flange 11 being adapted to abut against the outer face of said plate. Projecting from the front face of the plate 11 is a cylindrical shank 12 adapted to support the work in which it is desired to cut a key-seat. This work support 10—11—12 is provided with a radial slot 13 extending the entire length thereof and on each side of this slot the periphery of the shank 12 is provided with a groove 14 parallel to said slot and separated therefrom by means of the upward extension 15, the outer end of which is well within the periphery of said shank 12. In the slot 13 is positioned a cutter-bar 16, the shank end 17 of which is of such a depth as to lie entirely within the periphery of the shank 12 of the work support. The shank 17 is adapted to be secured in any well-known manner to a reciprocating member of the broaching machine. The working portion of the cutter-bar 16 is provided with a plurality of cutting teeth 18, these teeth being undercut as indicated at 19 on Fig. 3 of the drawings, and are inclined transversely of the cutter-bar, the alternate teeth being inclined in opposite directions as shown in Fig. 1.

In front of each tooth 18 is a tapered channel 20 adapted to receive the chips cut by the teeth 18. The lowest part of each channel 20 coincides with the upper end of the extension 15. The cutting edges of the teeth 18 are at gradually increased distances from the lower face of the cutter-bar, the teeth nearest the shank 17 being slightly outside of the upper face of the shank 17, while the tooth on the extreme end of the cutter-bar is of such a distance from said lower face as to give the full required depth of key-way. This bushing and cutter-bar is intended primarily for long key-ways, but it is adapted to work equally as well for shorter key-ways.

In the ordinary cutter-bars heretofore constructed, the chips removed in the cutting operation are liable to clog and prevent the proper operation of the cutter, so that several reciprocations of the movable member of the broaching machine are necessary before the key-way is finished. In the present device, however, with the gradually increasing depths of the teeth and a channel 20 in front of each tooth, these chips are adapted to be removed into the grooves 14, thereby permitting the cutter to operate advantageously and cut the full depth of the key-way in a single movement of said cutter-bar. It is obvious that by having the teeth 18 inclined transversely of the cutter-bar a shearing cut is effected. If the teeth 18 were all inclined in the same direction, the tendency would be in the operation of the cutter-bar to twist the cutter-bar to one side and cut a key-way of greater width than the cutter-bar itself. This is objectionable and is overcome by having the teeth alternately inclined in opposite directions, thereby equalizing the tendency to twist the cutter-bar laterally in the cutting operation and retaining it in perfect alinement with the center of the work support at all times. Inasmuch as the teeth 18 are undercut the chips cut by each tooth as it moves through the work are forced downwardly into the channel 20, and as this is tapered and its lower wall is inclined downwardly toward the grooves 14 the chips removed in the process of cutting are carried into these grooves 14 where they will not interfere with the operation of the cutting tool, the grooves 14 being well within the periphery of the shank 12 on which the work is positioned. While in the old type of cutter-bar where the teeth are straight the chips will quickly accumulate in a very short length of work, with the present form of cutter-bar a key-way of indefinite length may be cut with little difficulty. Preferably the shank end 17 is substantially the same length as the toothed portion of the cutter-bar.

It is believed that the operation and many advantages of this invention will be fully understood from the foregoing description.

Having thus described my invention, I claim:

1. In a device of the class described, a cutter bar having a body portion rectangular in cross section from one face of which projects a narrower centrally disposed member provided with a plurality of cutting teeth alternately oppositely inclined transversely thereof, said body portion being provided with tapered semicylindrical channels extending to the sides of said body portion and each disposed in front of one of said teeth.

2. In a device of the class described, a cutter bar having a body portion rectangular in cross section from one face of which projects a narrower centrally disposed member provided with a plurality of cutting teeth alternately oppositely inclined transversely thereof with their bases above said face, said body portion being provided with tapered semicylindrical channels extending to the sides of said body portion and each disposed in front of one of said teeth.

3. In a device of the class described, a cutter bar having a body portion rectangular in cross section from one face of which projects a narrower centrally disposed member provided with a plurality of cutting teeth alternately oppositely inclined transversely thereof, said body portion being provided with tapered semicylindrical channels extending alternately in opposite directions.

4. In a device of the class described, a guide consisting of a support having a cylindrical shank provided with a radial slot and a peripheral groove on each side of said slot and parallel therewith; and a cutter-bar fitted to and reciprocable in said slot having teeth inclined transversely thereof and a tapered channel in front of each tooth adapted to deliver the chips into said grooves.

5. In a device of the class described, a guide consisting of a support having a cylindrical shank provided with a radial slot and a peripheral groove on each side of said slot and parallel therewith; and a cutter-bar fitted to and reciprocable in said slot having teeth inclined transversely thereof alternately in opposite directions and a tapered channel in front of each tooth adapted to deliver the chips into said grooves.

6. In a device of the class described, a guide consisting of a support having a cylindrical shank provided with a radial slot and a peripheral groove on each side of said slot and parallel therewith; and a cutter-bar fitted to and reciprocable in said slot having teeth inclined transversely thereof alternately in opposite directions, and a tapered channel in front of each tooth adapted to deliver the chips into said grooves, said channels extending alternately in opposite directions and having their delivery ends above the adjacent walls of said grooves.

7. In a device of the class described, a guide consisting of a support having a cylindrical shank provided with a radial slot and a peripheral groove on each side of said slot and parallel therewith; and a cutter-bar fitted to and reciprocable in said slot having undercut teeth inclined transversely thereof and a tapered channel in front of each tooth adapted to deliver the chips into said grooves, the delivery ends of said channels being above the adjacent walls of said grooves.

Signed by me at New London, Conn., this 4th day of June, A. D. 1913.

FRANCIS J. LAPOINTE.

Witnesses:
CHAS. S. AMODON,
WALTER F. ELLIOTT.